Dec. 6, 1960 R. B. NELSON ET AL 2,963,616

THERMIONIC TUBE APPARATUS

Filed July 8, 1955 2 Sheets-Sheet 1

RICHARD B. NELSON &
ROBERT S. SYMONS
INVENTORS

BY Paul B. Hunter
ATTORNEY

RICHARD B. NELSON &
ROBERT S. SYMONS
INVENTORS
BY Paul B. Hunter
ATTORNEY

United States Patent Office 2,963,616
Patented Dec. 6, 1960

2,963,616

THERMIONIC TUBE APPARATUS

Richard B. Nelson, Los Altos, and Robert S. Symons, Mountain View, Calif., assignors to Varian Associates, San Carlos, Calif., a corporation of California Filed July 8, 1955, Ser. No. 520,831

16 Claims. (Cl. 315—5.54)

Figures 1, 2:
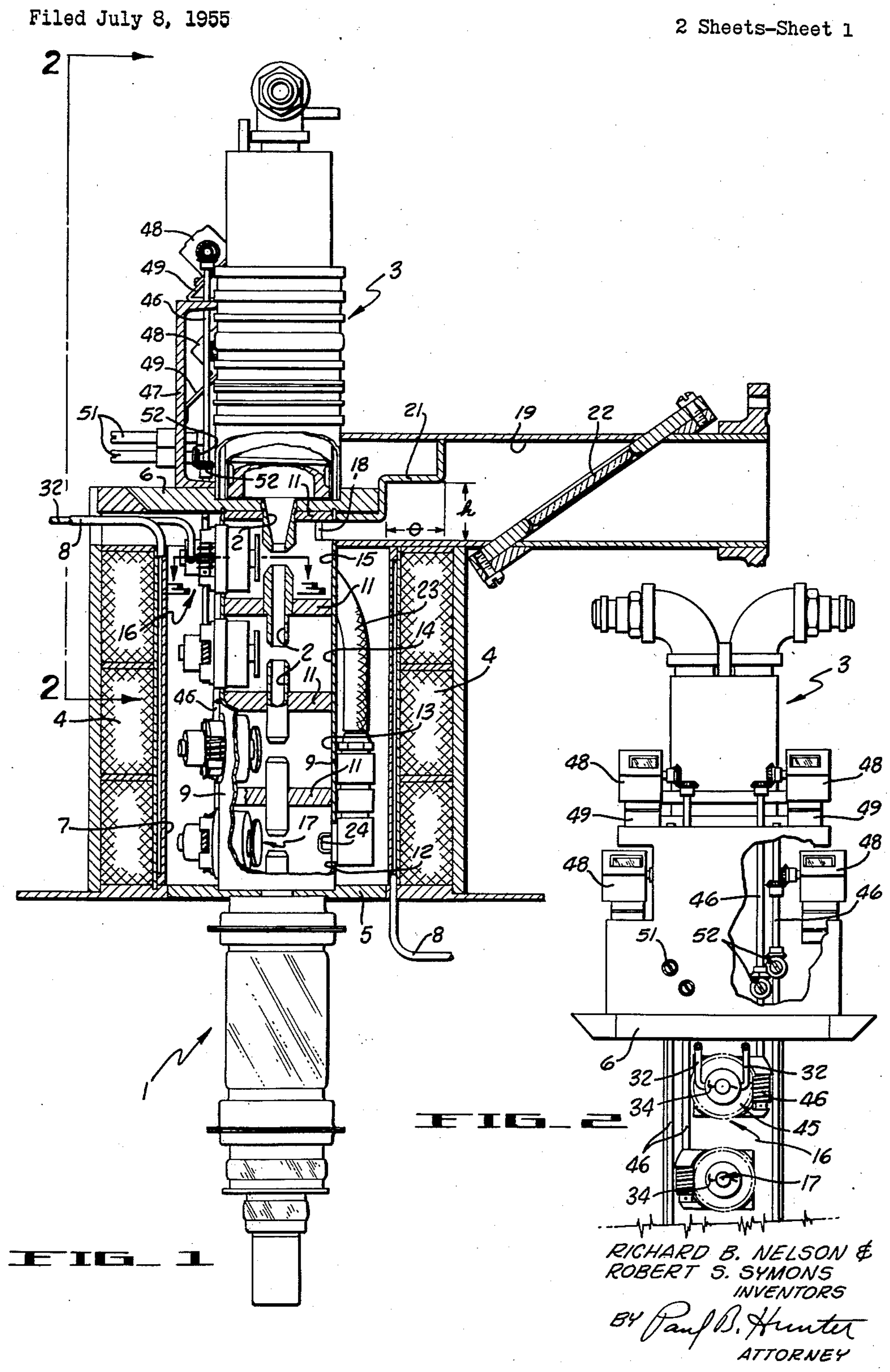

The present invention relates in general to an improved thermionic tube apparatus and, in particular, to novel thermionic tube apparatus employing cavity resonators, for example, high power klystron tubes useful in radar, microwave relays, linear accelerators, etc.

In the past, several different methods have been used to tune cavity resonator type devices such as are found in klystron tubes. The resonant frequency of such a cavity resonator is found in a first approximation from the following equation:

$$f_0=\frac{1}{2\pi\sqrt{LC}}$$

where L is the inductance of the cavity and C is the capacitance of the cavity. Generally the volume of a cavity resonator can be looked upon as the inductive portion of the resonant circuit, whereas the capacitance is largely found in the gap portion of the resonator. Since the capacitance varies inversely with the gap spacing it is common practice in tuning such devices to adjust the gap spacing. Ordinarily to adjust the gap spacing in multicavity tubes entails the use of end-wall diaphragms and attendant transverse structural discontinuities. Such a mechanism has relatively poor vibrational characteristics leading to poor electrical stability. Moreover, tuning for higher frequency would require increasing the gap spacing which has the deleterious effect of increasing the transit time of an electron across the gap resulting in loss of gain.

The present invention provides apparatus for varying the capacitance of the cavity resonator without the necessity of making the gap spacing adjustable. The basic relationship involved is that the capacitance is directly proportional to the mutually opposing area of charged plates. Thus the present invention alters the capacitance of the cavity resonator by introducing into the capacitive region of the resonator a conducting plate. Such a plate or tuning head can be introduced into the cavity without seriously disrupting the structural longitudinal continuity of the device. Furthermore the advantages of a short gap may be exploited at high frequencies.

In addition the present invention includes a novel improved impedance transformer providing a means for transforming a low conductance load to a high conductance load. Furthermore the impedance transformer provides means for presenting to the tube a conductance component of sending end admittance which is matched for maximum power output over the frequency range of the tube.

Accordingly, it is the object of the present invention to provide an improved thermionic tube apparatus capable of wide range tuning and of delivering maximum power output over the frequency range of the tube.

One feature of the present invention is a tuning plunger movable in close proximity to the interaction space of a cavity resonator thereby varying the capacitance across the interaction space and tuning the resonant frequency of the apparatus.

Another feature of the present invention is a novel tuning mechanism such that control motion from points remote from the apparatus can be transformed into desired translatory motion of the tuning plunger.

Still another feature of the present invention is a novel tuning indicator operated by the tuning mechanism such that a previous tuning setting may be returned to by attaining the previous dial setting.

Another feature of the present invention is the provision of a novel diaphragm shield associated with the flexible resonator vacuum sealing diaphragm such that currents circulating in the resonator walls are shunted through the diaphragm shield thereby preventing overheating of said diaphragm.

Another feature of the present invention is the provision of a novel tuning plunger having communicating hollow chambers therewithin for the circulation of coolant therethrough thereby preventing overheating of the tuning structure.

Another feature of the present invention is the combination of an impedance transformer coupled to the tube such that the high conductance portion of the transformer is presented to the tube thereby allowing shallow waveguides connecting to the tube to facilitate magnetic focusing.

One feature of the present invention is an improved impedance transformer adapted to provide a desired sending end conductance versus frequency characteristics.

Figure 3:
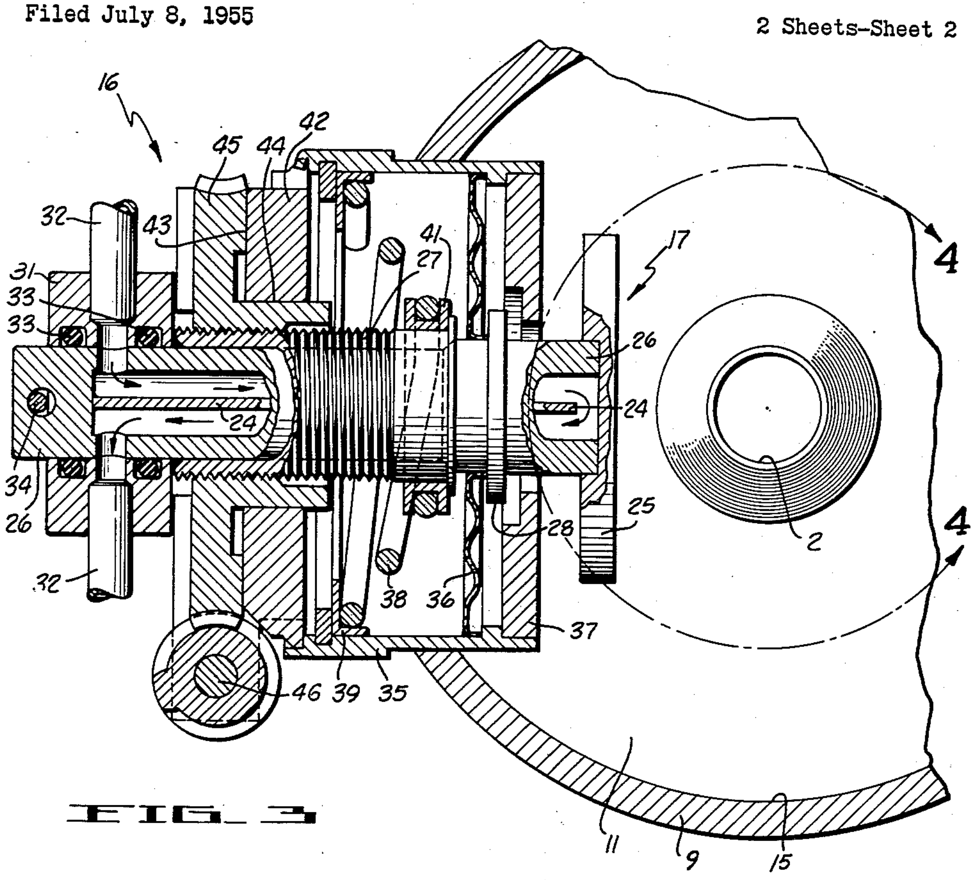
Figure 4:
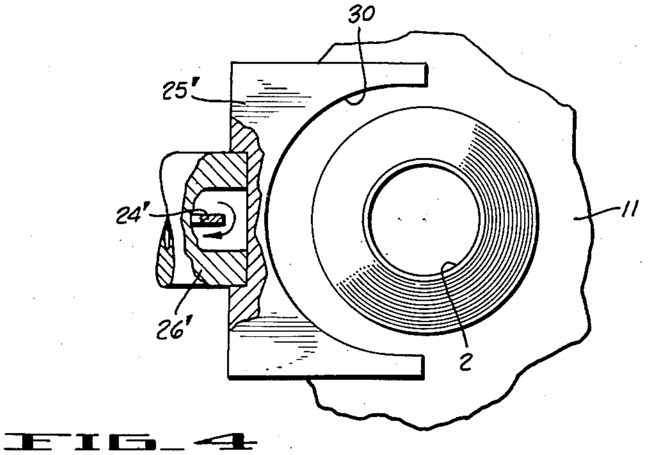

These and other features and advantages of the present invention will become evident upon a perusal of the following specification taken in connection with the accompanying drawings wherein:

Fig. 1 is a side view partly in section of a typical multicavity tube utilizing the present invention, Fig. 2 is a partial, cutaway view of Fig. 1 with the solenoid removed, taken along line 2—2 looking in the direction of the arrows, Fig. 3 is an enlarged cross-sectional view of Fig. 1 taken along line 3—3 looking in the direction of the arrows, and Fig. 4 is a modification of a portion of the structure of Fig. 3 encircled by line 4—4 of Fig. 3.

Referring now to Fig. 1, there is shown a typical tube employing cavity type resonators. At the lower extremity of the apparatus is a cathode assembly 1 wherein an electron beam is formed and directed into aligned mutually spaced drift tubes 2. The electron beam extends through the drift tubes and terminates in the collector assembly 3. Within the collector assembly the kinetic energy of the electrons is primarily transformed into heat energy which is carried away by coolant circulating through a jacket contained within the collector assembly. An electric solenoid 4 is provided encircling the tube midsection to provide a strong magnetic field for confining or focusing the electron beam in the drift tube region. At the ends of the solenoid 4 are annular magnetic pole pieces, cathode pole piece 5 and collector pole piece 6 designed such as to fashion the magnetic field therebetween in the desired shape. A solenoid coolant jacket 7 is provided about the inner circumference of solenoid 4 such that the windings making up the solenoid are not damaged by overheating. Fluid conduits 8 provide the means for ingress and egress of the solenoid coolant.

Comprising the high frequency section of the tube a tubular conductor 9 is carried between magnetic pole pieces 5 and 6 and is sealed at its ends thereto. Spaced along the length of said tubular conductor 9 are a plurality of annular transverse walls 11 forming a plurality of cavity resonators 12, 13, 14 and 15 defined by the interior surfaces of the transverse walls 11 and tubular conductor 9. The drift tubes 2 are carried in axial alignment by the transverse walls 11. The mutually opposing free end portions of said drift tubes form the resonator interaction spaces or gaps, therebetween.

Mounted in the side wall of each cavity resonator is the novel tuner assembly 16 of this invention having a tuning plunger 17 (see also Figs. 2 and 3) associated therewith and positioned near the resonator gap for varying the resonant frequency of the particular resonator. Communicating with the output cavity 15 through an output iris 18 is output waveguide 19 containing therewithin a novel microwave impedance matching transformer 21 and output window 22. The impedance transformer 21 provides a means for coupling energy out of the output cavity 15 through a shallow section of waveguide. Utilization of the shallow waveguide allows the beam confining coils 4 to extend nearer to the collector thereby preventing unwanted beam spreading in the output cavity and collector drift tube regions. In addition, the impedance transformer 21 may be modified in a novel manner to provide a means for presenting to the tube a conductance component of sending end admittance which is matched for maximum power output over the frequency range of the tube.

A standard binomial impedance transformer presents to the tube a constant conductance over the frequency range of the tube, which for some applications may be sufficient or desirable. However, for many applications, to attain maximum power transfer it is desired to make the tube's output conductance vary with the frequency of the tube in a prescribed manner. It has been found that a standard binomial impedance transformer may be modified to achieve this prescribed conductance versus frequency characteristic.

In modifying the transformer, any one or more than one of the transformer parameters may be varied, for example, the height $h$ of the transformer sections may be altered or the length of the transformer sections $\theta$ may be altered. It has been found that if $\theta$ is decreased below a quarter wavelength L, where L is the wavelength of the mid-frequency of the pass band, a characteristic of decreasing sending end conductance versus increasing frequency may be achieved. Conversely, if $\theta$ is increased over one-quarter L then sending end conductance will increase with increasing frequency. The individual sections need not be of identical length but may be made of different lengths to achieve the desired sending end conductance characteristic. Likewise the heights $h$ of the sections may also be altered from the standard binomial transformer design to achieve the desired sending end conductance characteristic. Although a two-section impedance transformer 21 is depicted the transformer may be composed of more or less than two sections.

The impedance transformer 21 may be coupled directly to the output iris as is shown in Fig. 1 or it may be disposed outwardly of the tube, for example, in the output waveguide. If the transformer is disposed outwardly of the tube the section of waveguide connecting the output iris to the transformer is included in the transformer design as a transformer section.

High frequency signal energy is conducted to the tube via coaxial line 23 and coupled into the input resonator through input loop 24. The input electromagnetic energy sets up an alternating electromagnetic field in the input cavity, said field having an alternating electric component in axial alignment with the resonator gap. The aforementioned axial electric field tends to velocity modulate the beam, that is, exert forces on the electrons of the beam which will slow certain electrons and increase the velocities of certain others thereby tending to form the electrons into bunches as they drift toward the collector. Successive cavities 13 and 14 likewise exert forces on the electrons tending to further increase the definiteness of these electron bunches as they transverse the drift tubes 2. In the output cavity, as these electron bunches pass therethrough, a greatly amplified electromagnetic field is set up in the output cavity. Electromagnetic energy is then extracted from the output cavity 15 through iris 18 thence propagated through waveguide 19 and window 22 to the load.

Referring now to Fig. 3, there is shown in detail one novel tuning assembly 16 mounted in the side wall of output cavity 15. The tuning plunger 17 comprises a flat conducting plate or head 25 carried upon the extremity of a hollow tubular tuner shaft 26. Although a flat type plunger head 25 is shown mounted in the tube this particular shape is not a requirement. In fact many different shapes could be envisioned, however, a plunger head designed such that its face adjacent the beam is shaped to conform to the contour of the outer periphery of the beam would substantially increase the capacitive effect of the tuner. Accordingly in Fig. 4 there is depicted one of many possible plunger designs incorporating a beam conforming face 30. The plunger head 25′ is shown carried upon plunger shaft 26′.

In addition the plunger comprises a threaded sleeve 27 as of, for example, non-magnetic stainless steel snugly fitting over and fixed upon said tuner shaft 26. In mounting and positioning the tuning plunger care should be exercised in design to maintain symmetry as much as possible. For example, the plunger should be mounted midway the length of the cavity and the opposing drift tube ends should be symmetrical to the plunger head. In this regard it should be noted that in the output cavity 15, wherein the last drift tube has been flared to permit the expansion of the beam, thicker drift tube walls are required. Accordingly to maintain symmetry the opposing drift tubes are made thicker walled. Symmetry prevents the setting up of unwanted modes of oscillation in the cavity.

Fixedly carried upon the tuner shaft is an annular flange or stop 28. Within the hollow tuner shaft 26 is a longitudinal baffle 24 running substantially the length thereof and having a free end portion at the inward end thereof thereby dividing the hollow cavity into two communicating chambers. Near the outward end of tuner shaft 26 are two openings in the side walls thereof for the ingress and egress of coolant which flows through the tuner shaft as shown by the arrows. Snugly fitting over the outward end of tuner shaft 26 is coolant connector 31 having passages therein communicating with the coolant openings provided in the side walls of tuner shaft 26. Attached to the coolant connector are fluid conduits 32 via which the coolant is conducted to and from the coolant connector 31. Encircling the inner circumference of the coolant connector on opposite sides of the coolant passages are two recesses carrying therewithin two O-rings 33 as of neoprene to prevent coolant leaks. A retaining pin 34 keeps coolant connector 31 upon plunger shaft 26.

A tubular tuner shell 35 is mounted in the side wall 9 of output cavity 15. A flexible apertured diaphragm 36 is carried within the tuner shell 35 and is secured at its inner circumference to tuner shaft 26 and at its outer periphery to tuner shell 35. The diaphragm closes off the cavity resonator and allows a vacuum to be maintained within the resonator while permitting motion of the tuner shaft 26. An annular wall, diaphragm shield 37, is mounted at the innermost end of the tubular tuner shell and is made of a good conducting material, for example, copper. The purpose of the diaphragm shield 37 is to provide a shunting path for the cavity circulating currents thereby preventing circulating currents from transversing the thin-walled diaphragm 36 and thereby causing it to overheat.

A spiral compression spring 38 encircles plunger shaft 26 and derives support at its outward extremity from an inward projection 39 of tuner shell 35. The inward end of spiral spring 38 is carried within an annular spring retainer 41 which is fixedly secured upon tuner shaft 26. An apertured transverse wall 42 is fixedly carried by the outward end of tuner shell 35. The wall 42 forms a transverse bearing 43 at its outside surface and a longitudinal bearing 44 about its inner peripheral surface. A bored worm gear 45 is disposed concentrically of the plunger shaft which extends outwardly of the cavity resonator through the aperture in transverse wall 42. Worm gear 45 is provided with threads on the inner circumference of its bore, said threads mating with threads of tuner shaft sleeve 27. A worm shaft 46 is placed tangentially to the toothed portion of worm gear 45 and furnishes the drive for worm gear 45. Turning of worm shaft 46 imparts rotation to worm gear 45. Spiral spring 38 maintains a tension force on plunger shaft 26 which is transmitted through tuner sleeve 27 to worm gear 45 and thereby keeps the worm gear in contact with transverse bearing surface 43. Contact is maintained even though the direction of rotation of worm gear 45 would, without the spring tension, tend to cause worm gear 45 to back off from the bearing surface 43. Thus worm gear 45 is continually kept in contact with transverse bearing surface 43 thereby remaining longitudinally stationary causing plunger shaft 26 to translate relative thereto.

Since the aforementioned elements of the tuner assembly are positioned within the confining magnetic field they should be made of non-magnetic materials. Accordingly most of the elements may be made of a non-magnetic good electrical and heat conducting material, for example, copper. Other parts required to take more physical abuse such as the spring 38, sleeve 27, diaphragm 36, bearing 42, worm gear 45 and worm shaft 46 may be made of, for example, a non-magnetic variety of stainless steel.

Referring now to Figs. 1 and 2 worm shafts 46 extend longitudinally of the tube through openings in collector pole piece 6 and side walls of channel 47 terminating at digital revolution counters 48. Revolution counters are supported by brackets 49 carried upon channel 47. Mounted on channel 47 and outwardly extending from the tube are a plurality of tuner drive shafts 51 driving, through the intermediary of beveled gears 52, worm shafts 46 and revolution counters 48.

In operation turning of driving shaft 51 imparts rotation to worm shaft 46. Worm shaft 46 in turn imparts rotation to worm gear 45 which causes translation of plunger shaft 26 thereby altering the spacing between plunger head 25 and the drift tube re-entrant portions. Varying the plunger head to drift tube spacing alters the capacitance of the cavity resonator thereby tuning the device.

Since many changes could be made in the above construction of this invention and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In a high frequency tube apparatus employing electromagnetic interaction between the fields of a cavity resonator and a beam of charged particles passable therethrough, a tuner assembly comprising a tuning plunger movable within the resonator and having a threaded extension protruding outwardly thereof transversely of the longitudinal axis of the tube apparatus, an annular toothed gear having teeth protruding outwardly from the periphery thereof and having a threaded inner circumference, said annular gear mounted encircling said threaded plunger extension such that said threaded portions mate, a second toothed means driving said annular gear, an extension of said second toothed means running longitudinally of said tube apparatus to thereby minimize the transverse dimension of the tube apparatus to facilitate focusing thereof, a driving means coupled to said second toothed means for imparting rotation thereto, and a digital revolution counting means coupled to said second toothed means for displaying the position of said tuning plunger.

2. In a thermionic tube apparatus having a cavity resonator, a tuner assembly comprising a capacitive tuning plunger movable within the resonator transversely of the longitudinal axis of the tube apparatus and having a threaded portion protruding outwardly of an opening in the resonator, a worm gear carried from the resonator and having a central threaded bore therethrough said tuning plunger having its threaded portion mating with the central threaded bore of said worm gear such that rotation of the worm gear is transformed into rectilinear translation of said tuning plunger, and a worm shaft driving said worm gear and having an extension thereof running longitudinally of the tube apparatus to thereby minimize the transverse dimension of the tube apparatus to facilitate focusing thereof.

3. In a thermionic tube apparatus, a tuner assembly as claimed in claim 2, a flexible diaphragm coupled to said plunger and closing the resonator opening thereby allowing a vacuum to be maintained within the apparatus.

4. In a thermionic tube apparatus, a cavity resonator adapted for producing electromagnetic interaction with a beam of charged particles passable therethrough and having an opening in a side wall thereof, a capacitive tuning plunger movable within said resonator and extending outwardly through the resonator for varying predominantly the capacitive parameter of the resonator, a tubular tuner shell carried by the resonator and protruding through the cavity opening and having its longitudinal axis running radially of said cavity resonator, a flexible metallic diaphragm carried within said tuner shell coupled to said plunger extension and closing the cavity opening thereby allowing a vacuum to be maintained within said cavity resonator, a wall having a bore therethrough carried by said tuner shell transversely thereof and providing a transverse bearing surface, a worm gear having a threaded bore therethrough disposed concentrically of and threadably mating with said threaded plunger extension and said worm gear riding on said transverse bearing surface, actuating means for producing rotation of said worm gear, and spring means coupled to said plunger and serving to produce tension force between said mated threaded portions of said plunger and said worm gear thereby forcing said worm gear to ride on the transverse bearing surface of said transversely disposed wall.

5. In a thermionic tube apparatus employing a cavity resonator having an opening in the side wall thereof, a tuning assembly comprising a predominately capacitive tuning plunger movable within the resonator and outwardly extending through the opening, a tuner shell mounted transverse of the cavity wall and carried within the cavity opening, a diaphragm coupled to said plunger extension and carried by said tuner shell thereby sealing the cavity opening, an extension of said tuner shell inwardly protruding of said shell and disposed within the cavity resonator inwardly of said diaphragm thereby forming a diaphragm shield, and a transverse projecting stop fixedly secured to said tuning plunger cooperating with said tuner shell extension to determine the maximum extent of plunger translation.

6. In an electron tube apparatus, a re-entrant cavity resonator, a tuning assembly comprising a tuning member having a flat electrical conducting surface disposed adjacent the re-entrant portions of said cavity resonator for varying predominately the capacitive parameter of said cavity resonator, a threaded hollow tuner shaft carrying said tuning member at its inward extremity, fluid conduit means coupled to said hollow tuner shaft for circulating coolant therethrough, a transverse projecting stop means carried by said tuner shaft, a cylindrical tuner shell carried by said resonator, a diaphragm shield means carried by said tuner shell for shunting cavity circulating currents therethrough, diaphragm means carried by said tuner shell and vacuum sealing said tuner shell to said tuner shaft, a bearing member transversely directed of and carried within said tuner shell, a bored worm gear mounted encircling said tuner shaft, a worm shaft driving said worm gear, spring means coupled to said tuner shaft thereby forcing contact between said worm gear and said transverse bearing member, an extension of said worm shaft extending longitudinally of the tube apparatus, a digital revolution counting means coupled to said worm shaft for determining the position of said tuning member within said cavity, and a multiple section impedance transformer coupled to the output of the tube, said transformer adapted such that the high sending end conductance portion of the transformer is presented to the tube thereby allowing the utilization of a shallow output waveguide.

7. In a velocity modulation tube apparatus, a multiple-step impedance transformer coupled to the output of the tube between the tube and a load, and having the high sending end conductance terminal of said transformer presented to the tube to allow the utilization of a shallow output waveguide whereby electron beam focusing is facilitated by allowing the focus coils to extend nearer to the collector end of the tube.

8. In a velocity modulation tube apparatus, a multiple-step impedance transformer comprising a transformer section, and the height of said section being variant from the standard binomial multisection transformer design whereby a certain desired sending end conductance versus frequency characteristic may be achieved.

9. In an apparatus as claimed in claim 1 wherein said tuning plunger comprises a movable capacitive tuning member disposed within the cavity in close proximity to the beam-field interaction spaces whereby predominantly the capacitive parameter of the cavity resonator may be varied as desired to effect tuning thereof.

10. In a high frequency apparatus, a multiple step impedance transformer transforming from lower to higher characteristic impedance comprising a transformer section of a length less than one quarter wave length long to thereby provide an increasing sending end conductance v. frequency characteristic for said impedance transformer.

11. In a high frequency apparatus, a multiple step impedance transformer transforming from lower to higher characteristic impedance comprising a transformer section of a length longer than one quarter wave length long to thereby provide a decreasing sending end conductance v. frequency characteristic for said transformer.

12. In an electron tube apparatus, a cavity resonator, said cavity resonator having a reentrant portion for defining a beam-field interaction space therebetween, a cavity tuner assembly including a predominantly capacitive tuning plunger extending transversely of and into said cavity resonator through an apertured side wall thereof, said tuning plunger having a conducting head portion supported upon a conducting extension portion, said tuning plunger disposed substantially midway of the length of said cavity resonator whereby the currents tending to flow in said tuning plunger extension portion are minimized to prevent unwanted heating and excitation of undesired electromagnetic modes of oscillation.

13. The apparatus according to claim 12 wherein said plunger head portion of said tuning plunger has its face thereof disposed adjacent the beam shaped to substantially conform to the peripheral contour of the reentrant portion of said cavity resonator thereby increasing the capacitive effect of the tuner.

14. In an electron tube apparatus, a cavity resonator, said cavity resonator having doubly re-entrant symmetrically disposed drift tube segments having two mutually opposed spaced apart free end portions for defining a beam field interaction space therebetween, a cavity tuner assembly including a predominately capacitive tuning plunger extending transversely of and into said cavity resonator through an apertured side wall thereof, said tuning plunger having a conducting head portion supported upon a conducting extension portion, said conducting plunger head portion disposed adjacent and radially outwardly of the outside periphery of said re-entrant drift tube portions and bridging the beam field interaction space defined between the free ends of said re-entrant drift tube portions for varying the capacity across the interaction space, said tuning plunger and conducting extension portion disposed substantially midway of the length of said cavity resonator whereby the currents tending to flow in said tuning plunger extension portion are minimized to prevent unwanted heating and excitation of electromagnetic modes of oscillation.

15. The apparatus according to claim 14 wherein said plunger head portion of said tuning plunger has its face thereof disposed adjacent the doubly re-entrant drift tube portions of said cavity shaped substantially to conform to the outside peripheral contour of said re-entrant drift tube portions thereby increasing the capacitive effect of the tuner.

16. The apparatus according to claim 12 wherein said cavity resonator is evacuated and including, means forming a flexible thin-walled diaphragm vacuum sealing said tuning plunger to said evacuated cavity resonator for allowing said tuning plunger to move within said evacuated cavity resonator without destroying the vacuum integrity thereof, and means forming a diaphragm shield inwardly disposed of said diaphragm means for shunting cavity circulating electrical currents in said cavity walls through said diaphragm shield thereby eliminating excessive undesired heating of said relatively thin-walled diaphragm means.

References Cited in the file of this patent

UNITED STATES PATENTS

| | | |
|---|---|---|
| 2,106,769 | Southworth | Feb. 1, 1938 |
| 2,280,824 | Hansen et al. | Apr. 28, 1942 |
| 2,402,443 | Peterson | June 18, 1946 |
| 2,410,109 | Schelleng | Oct. 29, 1946 |
| 2,450,893 | Hansen et al. | Oct. 12, 1948 |
| 2,490,030 | Cooke et al. | Dec. 6, 1949 |
| 2,496,535 | Hoglund et al. | Feb. 7, 1950 |
| 2,496,887 | Nelson | Feb. 7, 1950 |
| 2,529,950 | Kather | Nov. 14, 1950 |
| 2,578,699 | Hansen et al. | Dec. 18, 1951 |
| 2,606,302 | Learned | Aug. 5, 1952 |
| 2,656,484 | Cork | Oct. 20, 1953 |
| 2,741,718 | Wang | Apr. 10, 1956 |
| 2,765,423 | Crapuchettes | Oct. 2, 1956 |
| 2,768,327 | Millman | Oct. 23, 1956 |
| 2,797,361 | Glass | June 25, 1957 |
| 2,807,746 | Gardner et al. | Sept. 24, 1957 |
| 2,837,685 | Dalman | June 3, 1958 |
| 2,840,750 | White | June 24, 1958 |
| 2,857,549 | Beck et al. | Oct. 21, 1958 |

FOREIGN PATENTS

| | | |
|---|---|---|
| 1,105,843 | France | July 6, 1955 |